Nov. 28, 1972  D. K. KUEHL ET AL  3,704,184
ISOPYCNIC SLURRY FORMULATIONS
Filed Oct. 22, 1965  8 Sheets-Sheet 3

INVENTORS
DONALD KENNETH KUEHL
ARTHUR WADE BLACKMAN
IRVIN GLASSMAN
BY
MORGAN, FINNEGAN, DURHAM & PINE

ATTORNEYS

United States Patent Office

3,704,184
Patented Nov. 28, 1972

3,704,184
ISOPYCNIC SLURRY FORMULATIONS
Donald K. Kuehl, Manchester, Conn., Arthur W. Blackman, Cambridge, Mass., and Irvin Glassman, Princeton, N.J., assignors to United Aircraft Corporation, East Hartford, Conn.
Filed Oct. 22, 1965, Ser. No. 501,721
Int. Cl. C06b 15/00, 19/02
U.S. Cl. 149—1
3 Claims

ABSTRACT OF THE DISCLOSURE

The invention relates to slurry of a finely divided metal of a density substantially equal to a combustible liquid carrier. The metal may be in the form of hollow spheres containing lithium and low density metal hydrides or pentaborane, hydrazine, ethanol, water, nitrogen tetroxide and hydrogen peroxide. The combustible liquid carrier may include kerosene type fuels, hydrazine and pentaborane or liquid oxidizer carriers such as hydrogen peroxide, liquid oxygen, chlorine trifluoride and nitrogen tetroxide. These slurries are useful as liquid propellants or fuels.

---

Figure 1:
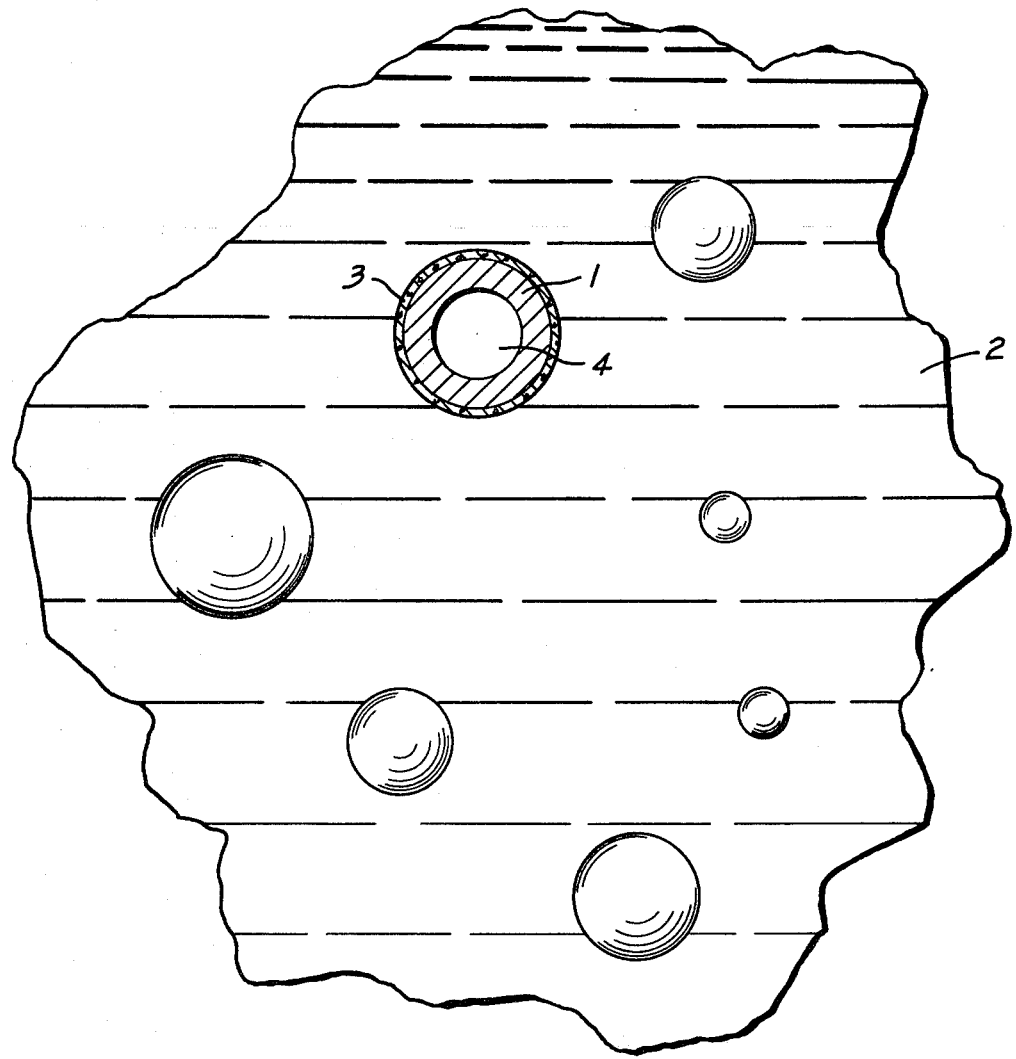

This invention relates to new and useful components of a liquid propellant or fuel and to a method for feeding metals to a combustion chamber utilizing such components. More particularly, this invention relates to improved metal propellant or fuel slurry formulations exhibiting improved characteristics, particularly improved stability qualities.

As will be readily apparent from the discussion appearing hereinafter, the principles of this invention are particularly adaptable for providing useful components of propellant compositions for use in monopropellant and bipropellant rocket motors. While the instant invention may be employed in a most advantageous manner in forming slurry formulations for feeding metals to the combustion chamber of a rocket motor, the principles of this invention are also applicable to any combustion chamber where one of the desirable ingredients among the reactants is a combustible metal capable of producing high energy. For example in non-rocket combustion systems employing an air-breathing engine (e.g. jet or ramjet engine) the metal and the fluid in which it is carried represent all or at least part of the fuel used in combustion. No oxidizer is required for an air breathing combustion engine except for the oxygen which is a natural component of the air. Thus, the isopycnic slurry used in application to a jet engine or a ramjet engine could be more specifically classified as a fuel rather than generally as a propellant. Typical carriers would include gasoline, kerosene type fuels, hydrazine, pentaborane, jet fuels, etc.

It is well recognized that specific impulse, density, and payload capabilities of almost any propellant combination can be improved by the addition of finely divided highly energetic metals. Examples of such are the improvements regarding the aforementioned characteristics that are obtained when metals such as aluminum or beryllium are fed to the combustion chamber of a rocket motor for enhancing the performance capabilities of both storable liquid bipropellants and liquid monopropellants.

In employing metal fuels for use in liquid propellant rockets, one approach for feeding the metal component is to form a slurry of the metal using as a carrier a fluid which is not one of the primary propellants, e.g., a liquid oxidizer. As an alternative, finely divided metal can also be added to one of the primary propellants to form a slurry.

While the use of a metal slurry for feeding metals to the combustion chamber of a rocket motor affords many advantages, one of the main difficulties encountered with such use is maintaining suitable storability and pumping characteristics because of the tendency of the metal particles to separate from the liquid carrier in gravitational fields or under conditions of high acceleration.

Accordingly, considerable efforts have been expended on the use of slurries as a basis for metal inclusion in rocket propellants, and particularly for improving the stability of such slurries to guard against the tendency of the metal particles to separate from the liquid carrier. One of the main techniques heretofore used for improving the stability of such metal slurries has been to incorporate in the slurry a material which promotes the formation of a gel structure in the liquid carrier thereby causing retention of the solid particles in suspension.

The utilization of a gel to solve the problem of phase separation has certain attendant disadvantages. First of all, if a high viscosity fluid is used, settling is very slow but it also becomes very difficult to pump at the flow rates required in a rocket motor. While the problem of pumpability may be overcome to a large extent by the formation of a thixotropic gel whose viscosity is reduced drastically on the application of shear forces, other problems are encountered even if the gel is thixotropic in nature. For example, many fuels and oxidizers have been gelled successfully, but compatibility relationships of slurried metals to gelled liquid oxidizers are not completely known and the presence of gelling agents, even though in small quantities, will reduce the available, or theoretical, impulse. In the application involving use of an additional fluid to act as a carrier for the metal powder, additional performance losses result when the carrier selected is less energetic than the primary propellants.

Another technique that has been suggested for improving the stability of slurried propellants is reducing the size of the metal particles. Reduction of the size of the metal particles only slows down the settling process, but does not stop it, and the increased surface area will result, usually, in either a higher reactivity (perhaps requiring encapsulation for handling to prevent pyrophoricity), or a high weight fraction of oxide coating.

Objects and advantages of the invention will be set forth in part hereinafter and in part will be obvious herefrom, or may be learned by practice with the invention, the same being realized and attained by the steps, methods, compositions, combinations and improvements pointed out in the appended claims.

The invention consists in the novel steps, methods, compositions, combinations and improvements herein shown and described.

It is an object of this invention to provide improved liquid propellants or fuels, in the form of a non-settling slurry, for use in the combustion chambers of motors and engines, including rocket motors and air-breathing engines.

A further object of this invention is to provide an improved method for feeding metals to the combustion chamber of motors or engines, including rocket motors and air-breathing engines.

It is an object of this invention to provide improved liquid propellants, in the form of non-settling slurries for use in rocket propulsion, particularly for storable liquid bipropellant and monopropellant rockets.

A further object of this invention is to provide an improved method for feeding metals to the combustion chamber of a rocket motor, particularly storable liquid bipropellant and monopropellant rockets.

A still further object of this invention is to provide improved liquid propellants, in the form of non-settling slurries for use in rocket propulsion, which enables an improvement in specific impulse performance.

Yet a further object of this invention is to provide improved liquid propellants, in the form of non-settling slurries for use in rocket propulsion, capable of compensating for fluctuations in temperature.

A further object is to provide improved liquid fuels, in the form of non-settling slurries for use in air-breathing engines, and to an improved method, employing said fuels, feeding metals to the combustion chamber or engines.

It has been found that one of the main objectives of the instant invention may be realized, i.e., the provision of a stable highly energetic metal slurry for use in rocket motors or air-breathing engines, by the use of finely divided metal, generally spherical metal particles, having the same density as a liquid carrier therefor, so that when mixed with said liquid carrier, the resultant slurry is very stable with no separation of metal due to gravity or buoyancy effects. As will be readily apparent from the discussion which follows, the spherical metal particles are hollow metal spheres which may contain either a void or an appropriate filler to attain certain desired performance characteristics such, for example, as a low density energetic material to enhance specific impulse performance or a high coefficient of thermal expansion liquid to obtain a slurry capable of compensating for fluctuations in temperature.

From the above discussion, it is seen that the basic approach through which stable or non-settling slurries are formed in accordance with the present invention is the utilization of hollow metal spheres formed to match in density the carrier fluid to be used. For convenience sake, slurries of the aforedescribed type are referred to as "isopycnic slurries." It should be mentioned that although aluminum and beryllium are mentioned most consistently herein in regards to being the metal component of an isopycnic slurry, other metals including but not limited to magnesium, lithium, zirconium, titanium, and boron, can be classified as candidates for inclusion in isopycnic slurries.

In forming the hollow metal spheres used in accordance with out invention, any of the commonly used conventional techniques for producing hollow metallic particles may be used. For example, techniques for fabricating such hollow metal particles are described in co-pending application Ser. No. 818,061, filed June 4, 1959, now U.S. Pat. No. 3,135,055. There are in general several techniques by which particles can be manufactured for use in the preparation of isopycnic slurries. Other ways should be easily derived from an understanding of the concept. In one technique, a spherical core is established (obviously in great numbers) which is coated with a thin porous metal layer. The core is removed from within this porous metal layer by solution, evaporation, sublimination or other process through the pores, and the resulting hollow sphere is further coated with metal to seal the porosities. This can prevent leakage of carrier fluid into the hollow sphere during preparation of the isopycnic slurry or during prolonged storage. Alternatively, the hollow porous sphere may be filled with a low density fluid, non-reactive with the metal, before sealing of the pores to produce liquid filled isopycnic particles.

In a second general technique for the preparation of isopycnic particles, a core is prepared, spherical or otherwise, of a low-density, solid, energetic fuel material. This core is then coated directly with the metal to the required thickness, and the entire particle is then used in preparing an isopycnic slurry. This results in a solid core particle somewhat different from the particles whose preparation was described above and which were either hollow or liquid filled. In this case, the particle is not only solid cored but may also be nonspherical, the ultimate shape depending on the shape of the core and the thickness of metal deposited.

A third technique, particularly suited to the preparation of temperature-compensated isopycnic slurries requires initial encapsulation of small droplets of low density, high thermal expansion, high energy liquids by a thin coating of plastic material. This plastic material should be nonreactive with the liquid core material, the metal to be deposited, and if possible, the carrier fluid. This plastic-encapsulated liquid droplet, prepared by any of several applicable commercial processes, serves then as the core for metal deposition to the required thickness.

A fourth technique is based on forming initially hollow plastic cores of very thin wall. These cores are then coated with metal as in the previously described methods, but the plastic shell remains in place. The plastic shell can be a reactive material, such as nitrocellulose, or a material such as polyethylene which has some fuel value. These plastic cores are preferably filled with hydrogen, rather than an inert gas, but the gaseous weight of even the inert gases is not high enough to have much effect on the overall density. The use of the hollow plastic core serves two purposes: (1) if the metal as deposited is not completely impervious, the plastic core prevents carrier fluid from penetrating the hollow core, and (2) a gas such as hydrogen retained in the core will burst the particle in a combustion chamber, facilitating combustion.

The exact thickness of metal buildup required to achieve the proper density to match that of the carrier fluid cannot be precisely determined without precise knowledge of the densities and amount of each of the underlying components. However, using several assumed densities and thickness, which are typical but not universally applicable, examples can be given which show typical particle dimensions, weights and densities to achieve isopycnic behavior at a specific temperature. The presence of a very thin protective coating around each particle used in a reacting carrier (e.g., an oxidizing fluid) which may consist of either a protective oxide coating or a protective plastic coating can be neglected in these examples of calculated density and dimension. However, such a protective coating should be present when required, even though of negligible effect on diameter or density.

Reference is now made to FIG. 1 which shows a schematic diagram of a slurry formed from specific gravity regulated spheres, wherein hollow reactive metal spheres 1 are suspended in a fluid carrier 2, e.g., a liquid propellant or liquid oxidizer, by virtue of the spherical particles, including non-reactive coating 3, having approximately the same density as the fluid carrier.

As indicated above, in the embodiment of FIG. 1 the spherical particles 1 are covered by a non-reactive coating 3. More particularly, when the metal is highly reactive, e.g., beryllium, the particles should be encapsulated or coated with a thin layer of a material stable and substantially inert to oxygen at ordinary conditions, but readily volatilizable, decomposable or otherwise capable of dissipating at the combustion temperature of the propellant system, thereby permitting ready access of the metal to the combustion process, when ignition temperature is reached. Suitable non-reactive coating materials include waxes, plastics and resins such as Kel-F or Teflon, low boiling metals and metal alloys, and the like.

For beryllium, particularly suitable encapsulating films include polytetrafluoroethylene polymers and copolymers (Teflon), polymers and copolymers of trifluorochlorethylene (Kel-F) and aluminum.

With certain metals, e.g., beryllium and aluminum and alloys containing beryllium or aluminum, in addition to the non-reactive coatings of the type referred to above and which are applied independently, the non-reactive coating may be the inherent protective oxide coating which normally forms on some metals on exposure to air.

In the embodiment of FIG. 1, the combination of metal 1 and coating 3 must be non-porous to prevent seepage of the liquid carrier fluid 2 into the void 4 which would upset the density balance.

Control of liquid density as well as, or in place of, the solid density by judicious mixing of two compatible liquids of densities bracketing the metal density provide an alternative approach to the isopycnic slurry.

Figure 2:
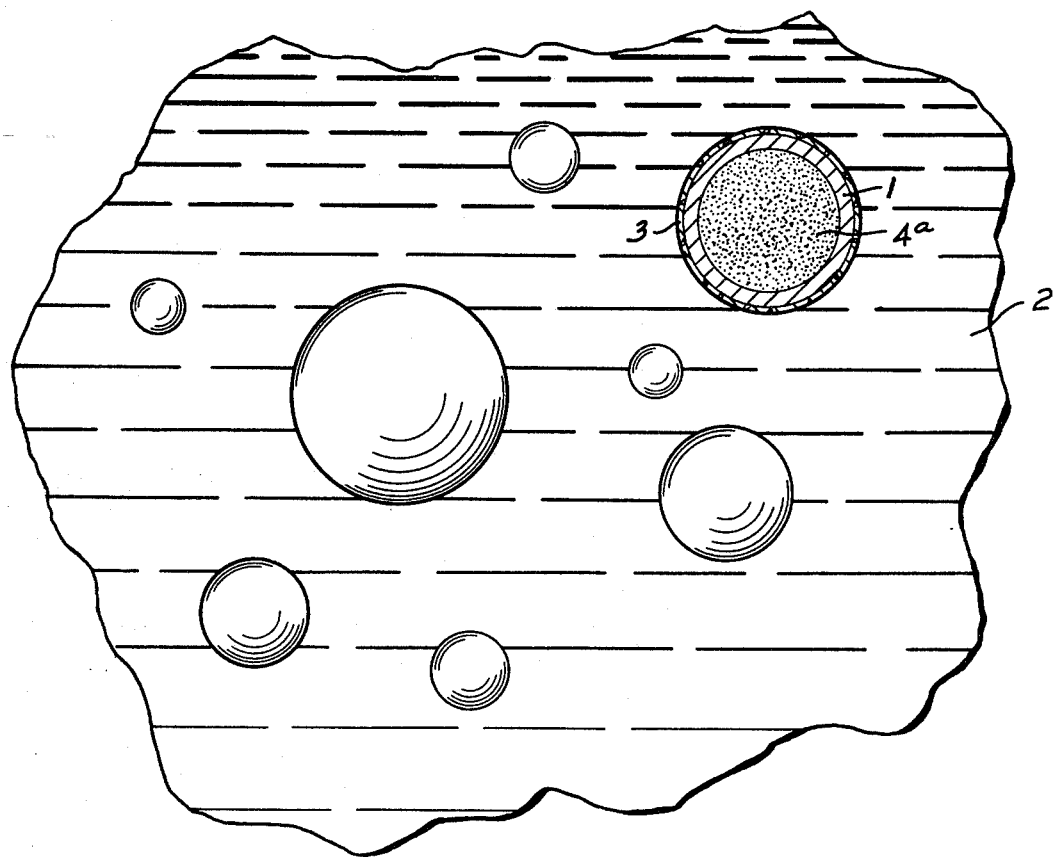
Figure 3:
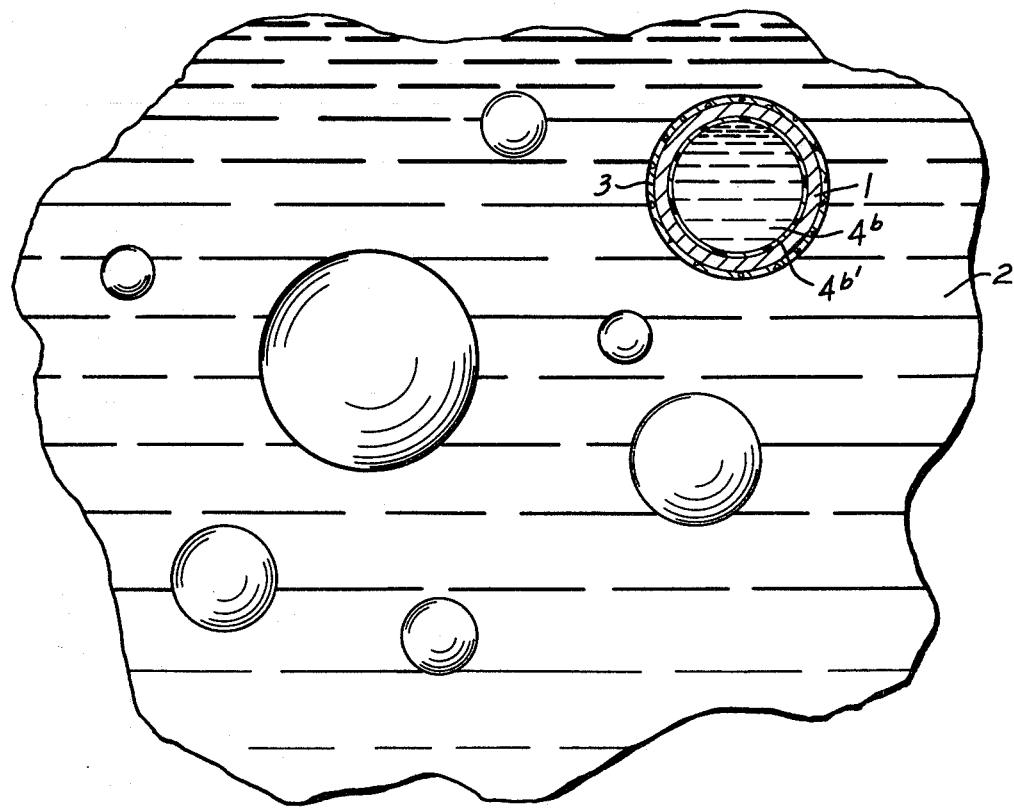

Reference is now made to FIG. 2 and FIG. 3 of the drawings which illustrate additional embodiments within the principles of the instant invention. Both of the systems illustrated in FIG. 2 and FIG. 3 are similar to those shown in FIG. 1 apart from the fact that in the spherical particles of the systems of FIG. 2 and FIG. 3 instead of voids there are present reactive cores, respectively, for improving the characteristics of the metal fuel.

More particularly, in the system shown in FIG. 2, the reactive core material 4a is a highly energetic solid material, e.g., $AlH_3$, which improves specific impulse performance. In FIG. 3, described hereinlater in detail, the reactive core is composed of a liquid 4b of a lower density and higher thermal expansion than the carrier liquid 2 enclosed with a selected plastic 4b' of appropriate density.

In both the embodiments of FIG. 2 and FIG. 3, the metal is applied to the reactive core until the combined density of the resulting core-filled metal particle is equal to the density of the carrier 2. In addition, as is the case of the embodiment of FIG. 1 described hereinbefore, the combination of metal 1 and coating 3 must be non-porous to prevent seepage of the fluid 2 into the reactive core which would upset the density balance.

Example of propellant combinations which lend themselves to the isopycnic concept of this invention in terms of feasibility and potential increase in performance are given in the tables which follow. It will be noted that in the general examples which follow there are included both of the embodiments of FIG. 1 (hollow metal particles having voids) and the embodiments of FIG. 2 (hollow metal particles filled with solid filler for improving specific impulse performance).

MONOPROPELLANTS (1) Beryllium in hydrogen peroxide (10–50% Be)
(2) Aluminum in hydrogen peroxide (20–50% Al)
(3) Beryllium in chlorine trifluoride (10–50% Be)
(4) Aluminum in chlorine trifluoride (15–35% Al)
(5) Aluminum covered beryllium hydride in hydrogen peroxide (10–50% Al) (5–25% $BeH_2$)
(6) Berryllium covered beryllium hydride in hydrogen peroxide (10–40% Be) (5–15% $BeH_2$)
(7) Aluminum covered aluminum hydride in hydrogen peroxide (2–10% Al) (15–50% $AlH_3$); beryllium covered aluminum hydride in hydrogen peroxide (2–10% Be) (15–50% $AlH_3$); aluminum covered lithium in chlorine trifluoride (10–25% Al) (3–10% Li)
(8) Aluminum covered lithium hydride in chlorine trifluoride (10–30% Al) (2–10% LiH); beryllium covered lithium in chlorine trifluoride (10–50% Be) (0.2–2.0% Li)
(9) Beryllium covered lithium hydride in chlorine trifluoride (10–50% Be) (0.2–2.0% LiH)
(10) Aluminum covered beryllium hydride in chlorine trifluoride (15–40% Al) (1–6% $BeH_2$)
(11) Beryllium covered beryllium hydride in chlorine trifluoride (10–50% Be) (0.2–2.0% $BeH_2$)
(12) Aluminum covered aluminum hydride in chlorine trifluoride (4–20% Al) (6–30% $AlH_3$); beryllium covered aluminum hydride in chlorine trifluoride (5–45% Be) (.5–5% $AlH_3$)
(13) Aluminum covered aluminum hydride in nitrogen tetroxide (1–10% Al) (15–50% $AlH_3$)
(14) Aluminum covered beryllium hydride in nitrogen tetroxide (5–40% Al) (5–35% $BeH_2$); beryllium covered aluminum hydride in nitrogen tetroxide (2–20% Be) (10–40% $AlH_3$); beryllium covered beryllium hydride in nitrogen tetroxide (10–40% Be) (5–15% $BeH_2$)

BIPROPELLANTS

(15) Hydrazine [1] plus beryllium in nitrogen tetroxide (2–30% Be) (20–65% $N_2O_4$)
(16) Hydrazine [1] plus aluminum in nitrogen tetroxide (5–40% Al) (15–50% $N_2O_4$)
(17) Hydrazine [1] plus beryllium in hydrogen peroxide (1–35% Be) (20–75% $H_2O_2$)
(18) Hydrazine [1] plus aluminum in hydrogen peroxide (3–40% Al) (20–70% $H_2O_2$)
(19) Hydrazine [1] plus beryllium in chlorine trifluoride (2–35% Be) (45–85% $ClF_3$); hydrazine [1] plus aluminum in chlorine trifluoride (1–20% Al) (45–80% $ClF_3$)
(20) Pentaborane plus beryllium in hydrogen peroxide (2–20% Be) (55–85% $H_2O_2$)

Alternate combinations include:
(21) Nitrogen tetroxide plus beryllium in hydrazine [2] (2–30% Be) (15–60% $N_2H_4$)
(22) Nitrogen tetroxide plus aluminum in hydrazine [2] (5–40% Al) (5–60% $N_2H_4$)
(23) Hydrogen peroxide plus beryllium in hydrazine [2] (1–35% Be) (10–65% $N_2H_4$)
(24) Hydrogen peroxide plus aluminum in hydrazine [2] (3–40% Al) (15–60% $N_2H_4$); chlorine trifluoride plus beryllium in hydrazine [1] (2–35% Be) (2–24% $N_2H_4$); chlorine trifluoride plus aluminum in hydrazine [2] (1–20% Al) (10–40% $N_2H_4$)

Figure 4:
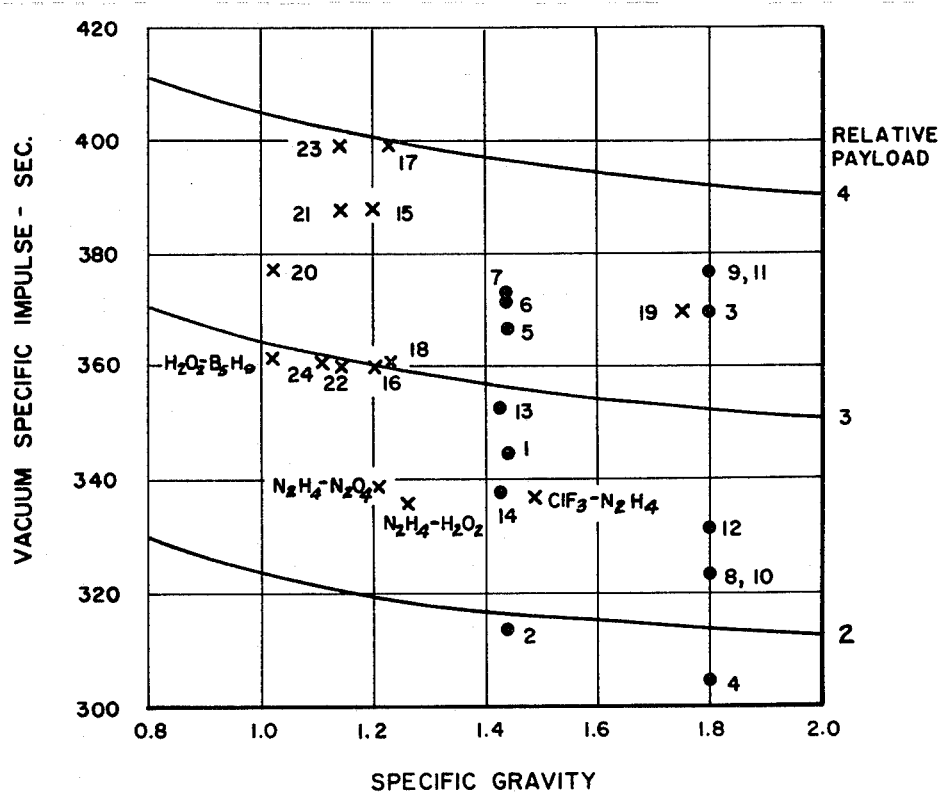

The performance of selected propellant combinations is shown in FIG. 4, where the numbers identifying the plotted points represent the propellants identified similarly in the above tables.

The following are specific working examples of the embodiment of FIG. 1, namely, Examples 1 and 2 (useful in a rocket motor) and Example 3 (useful in a jet engine), and the embodiment of FIG. 2, namely, Example 4 (useful in a rocket motor).

EXAMPLE 1

Monopropellant system with hollow beryllium particles isopycnic with hydrogen peroxide at about 68° F. (20° C.)

Carrier liquid—$H_2O_2$
Carrier density—1.445 gm./cc.
Metal—Be
Metal density—1.85 gm./cc.
Particle diameter, outer—10.0 microns
Particle diameter, inner—6.03 microns
Particle density—1.445 gm./cc.
Typical weight percent of metal in slurry—35
Typical weight percent of carrier in slurry—65

EXAMPLE 2

Bipropellant system with hollow aluminum particles isopycnic with fuel

Oxidizer—$H_2O_2$
Weight percent $H_2O_2$ in total propellant system—30.2
Fuel—aluminum in hydrazine
Carrier—$N_2H_4$
Carrier density—1.0079 gm./cc.
Metal—aluminum
Metal density—2.70 gm./cc.
Outer diameter, aluminum—15 microns
Inner diameter, aluminum—12.836 microns
Effective density—1.0079 gm./cc.
Weight percent Al in fuel—45.85
Weight percent carrier in fuel—54.15
Weight percent Al in total propellant system—32.0
Weight percent $N_2H_4$ in total propellant system—37.8

---
[1] Or UDMH (unsymmetrical dimethyl hydrazine) or MMH (monomethyl hydrazine) or $B_5H_9$ or other hydrogen containing fuels or mixtures of any combination of these.
[2] Or UDMH or MMH or $B_5H_9$ or other hydrogen containing fuels or mixtures of any combination of these.

EXAMPLE 3

Hollow magnesium particles isopycnic with kerosene type jet fuel (JP4)

Carrier liquid—JP4
Carrier density—0.785 gm./cc.
Metal—Mg
Metal density—1.57 gm./cc.
Particle diameter, outer—20.0
Particle diameter, inner—15.87
Particle density—0.785 gm./cc.
Typical weight percent of metal in slurry—45
Typical weight percent of carrier in slurry—55

A general proportion for the metal particles in a slurry of the above illustrated type is 1–65%.

EXAMPLE 4

Monopropellant system with solid ($AlH_3$) filled aluminum particles isopycnic with nitrogen tetroxide at about 68° F. (20° C.)

Carrier liquid—$N_2O_4$
Carrier density—1.445 gm./cc.
Metal—aluminum (Al)
Metal density—2.70 gm./cc.
Core material—$AlH_3$
Core density—1.3 [3] gm./cc.
Core diameter—9.644 microns
Particle diameter—10.0 microns
Weight percent of core in particle—80.7
Weight percent of metal in particle—19.3
Density of particle—1.445 gm./cc.
Typical weight percent of $AlH_3$ in slurry—39.2 percent
Typical weight percent of Al in slurry—9.4 percent
Typical weight percent of carrier in slurry—51.4 percent As indicated hereinbefore in reference to the embodiment of FIG. 3, within the scope of the present invention is the provision of isopycnic slurries capable of compensating for fluctuations in temperature.

With isopycnic slurries employing spherical particles having voids (the embodiment of FIG. 1), as long as the temperature of the liquid carrier remains constant, its density will not change, and relative stability will result. In the case of a cryogenic liquid, such as liquid oxygen, which is kept at its boiling point, temperature compensation is not required. However, in the case of storable propellants, such as hydrazine, nitrogen tetroxide, or hydrogen peroxide, temperature changes which normally occur on storing will result in finite density changes. A change of 10° C. from the design temperature can cause a settling or floating rate of a foot per day for a 10 micron particle, or four feet per hour for a 100 micron particle, even though these particles are neutral in buoyancy at the design temperature. For this situation, either very exact temperature control is required, or some form of automatic temperature compensation would be desirable.

A considerable amount of temperature compensation can be accomplished by using liquid filled metal particles instead of hollow ones, if the filling liquid is both lower in density than the carrier liquid, and is enclosed in a flexible, nonpermeable plastic. The best temperature compensation results in the case where the filling liquid has a higher coefficient of thermal expansion than the carrier fluid. A typical particle of liquid filled metal in a temperature-compensating isopycnic slurry is indicated in FIG. 3. The filling liquid is enclosed in flexible, nonpermeable plastic $4b'$ which is further coated with metal 1 with protective coating 3 until the average density of the particle equals the density of the carrier liquid 2 at the design temperature. The best propellant performance will result when the filling liquid $4b$ is a suitable fuel or oxidizer, preferably a fuel containing hydrogen.

[3] Based on the use of porous material of less than theoretical density.

The best temperature compensation will result when the filling liquid $4b$ has both a lower density and a higher coefficient of thermal expansion than the carrier fluid 2, and the flexible, nonpermeable coating $4b'$ around the filling liquid $4b$ is of the proper density. This is very important since in a well compensated particle, a difference of twofold in the density of the coating $4b'$ may make as much as a tenfold change in settling or floating rate.

For temperature compensated isopycnic slurries, the following fluids are typical of those that can be utilized as fillings: nitrogen tetroxide, pentaborane, ethyl alcohol, hydazine, hydrogen peroxide and water. Other fluids may be equally suitable, but the criteria are mainly compatibility, low density, high thermal expansion, and suitability as fuel or oxidizer. Plastics which are suitable for encapsulation of filling fluids are numerous, but not all are suitable for any one filling fluid. For example, polyethylene, lucite, and ethyl cellulose are among those suitable for encapsulation of hydrazine whereas Kel-F, polyvinyl acetate, polyvinyl chloride, Geon, Saran, and nitrocellulose are among many which are unsuitable. Existing information is available on which to base elimination of many plastics on the basis of their reactivity with any specific filling fluid, but there are many which are suitable with at least some fluids. A typical but not exclusive list will include, besides those already mentioned, plastics such as: gelatins, polyurethane, Teflon, polystyrene, polypropylene, polymethylmethacrylate, and nylon.

Typical systems which are amenable to temperature compensation include but are not limited to the following:

(1) Pentaborane filled beryllium particles in a hydrazine slurry;
(2) Pentaborane filled berryllium particles in a hydrogen peroxide slurry;
(3) Alcohol filled beryllium particles in a hydrogen peroxide slurry;
(4) Hydrazine filled beryllium particles in a hydrogen peroxide slurry; and
(5) Hydrazine filled aluminum particles in a hydrogen peroxide slurry.

The following is a specific working example of a temperature compensated slurry of this invention:

EXAMPLE 5

Temperature compensated slurry

Particles:
    Filling—$B_5H_9$ (pentaborane)
    Filling density—0.6225 gm./cc.
    Plastic shell—polyethylene
    Plastic shell density—0.915 gm./cc.
    Plastic shell OD—10 microns
    Plastic shell thickness—0.175 micron
    Metal—beryllium
    Metal density—1.85 gm./cc.
    Metal ID (=plastic shell OD)—10 microns
    Metal OD—11.242 microns
    Metal thickness—0.621 micron
    Weight percent $B_5H_9$ in particle—39.2
    Weight percent plastic in particle—6.4
    Weight percent metal in particle—54.4
    Particle density—1.0079 gm./cc.
Carrier:
    Carrier—$N_2H_4$
    Carrier density—1.0079
    Weight percent $N_2H_4$ in slurry—50
    Weight percent particles in slurry—50
Oxidizer:
    Oxidizer (typical)—$N_2O_4$
    Weight percent $N_2O_4$ in total propellant system—44.0
    Weight percent $N_2H_4$ in total propellant system—28.0

Oxidizer—Continued

Weight percent $B_5H_9$ in total propellant system— 11.0

Weight percent polyethylene in total propellant system—1.8

Weight percent Be in total propellant system—15.2

Figure 5:
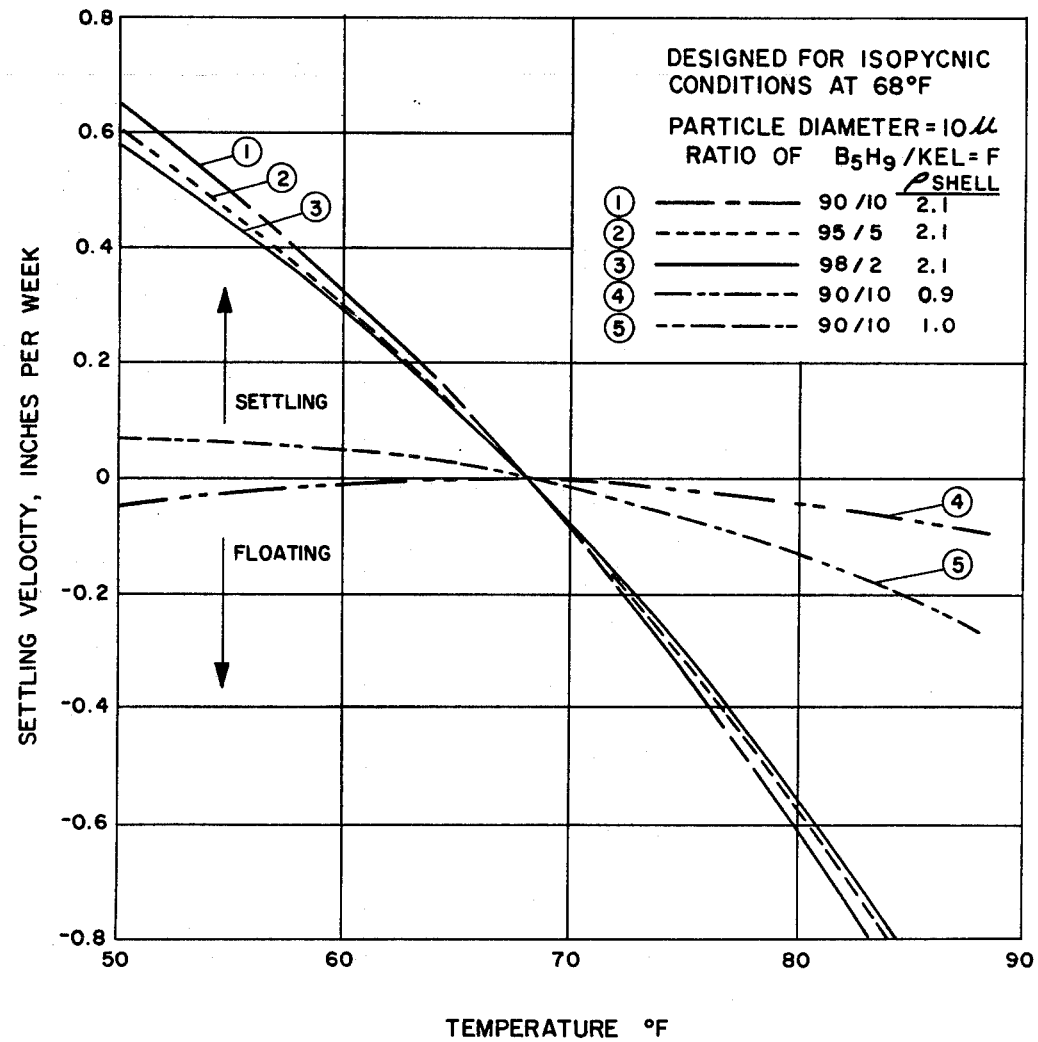

FIG. 5 shows the effect of the coating (plastic shell) density on the relative settling and floating rates of pentaborane filled beryllium particles in liquid hydrazine. The 90/10, 95/5, and 98/2 curves [(1), (2) and (3)] for Kel-F coated $B_5H_9$ show that the relative percentage of liquid filling to plastic coating is not of major importance. Comparison of the Kel-F (density 2.1 gm./cc.) curves with curves (4) and (5) for plastics with densities respectively of 0.9 and 1.0 in the same $B_5H_9$-Be-$N_2H_4$ system indicates the relative importance of this parameter. A settling rate of less than 0.1 inch per week compares favorably with the settling/floating rates of 10 inches per week which result over the same temperature range when using the same diameter hollow beryllium particles in hydrazine without temperature compensation or control.

Figure 6:
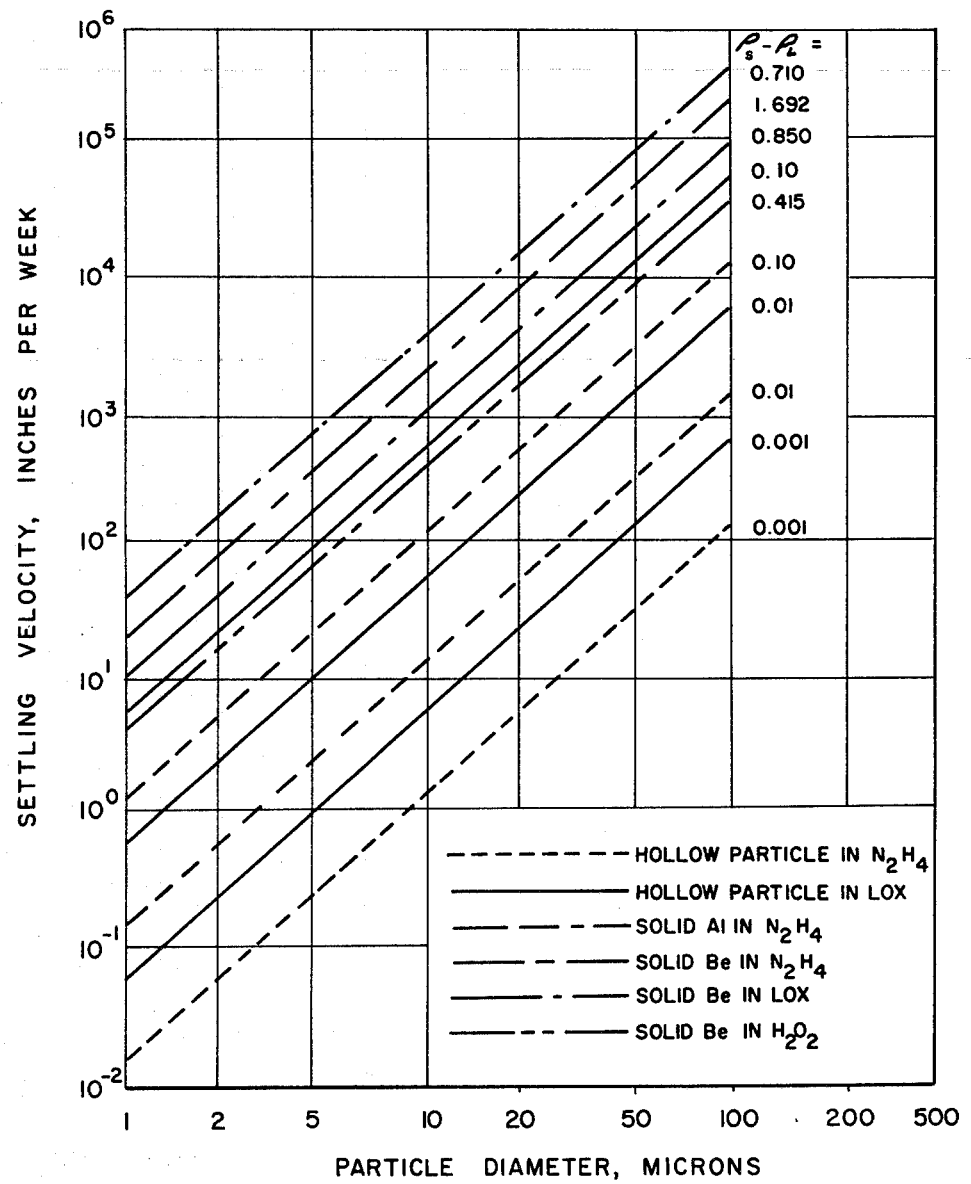

The settling rate of a particle of given diameter and fixed density in a fluid of fixed density and viscosity can be calculated quite readily. These settling rates have been plotted for solid aluminum and beryllium particles for several fluids, and for hollow particles in hydrazine or liquid oxygen for specific density differences. These are shown in FIG. 6. It can be noted that particles of a given size and density differences settle more slowly in $N_2H_4$ than in liquid oxygen (LOX). This is due to viscosity differences.

Figure 7:
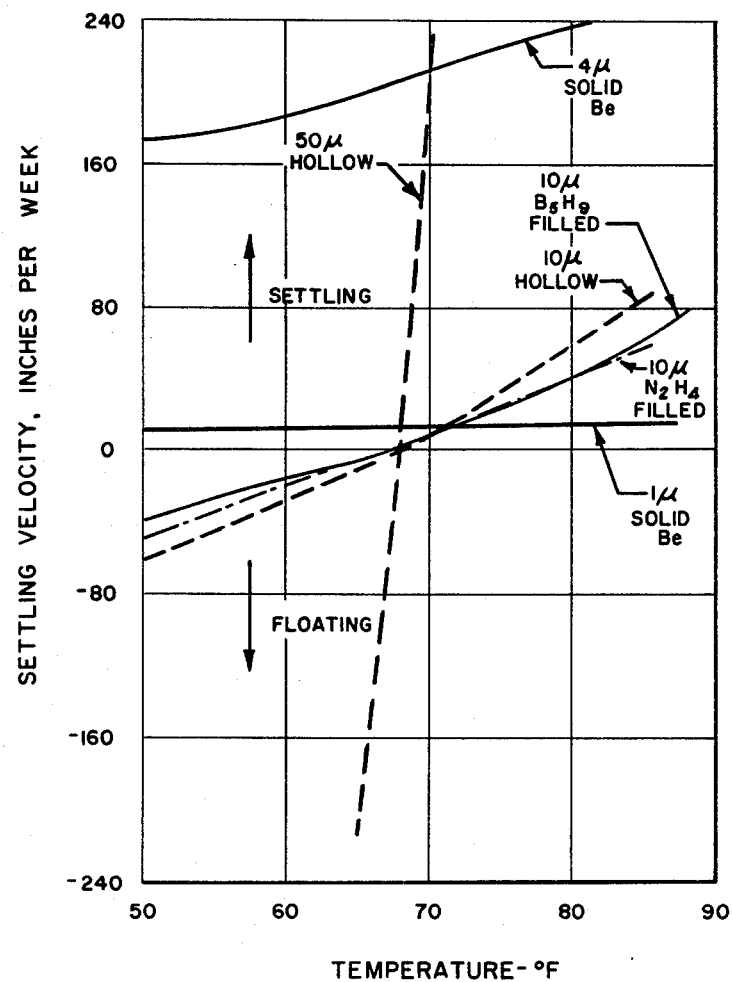
Figure 8:
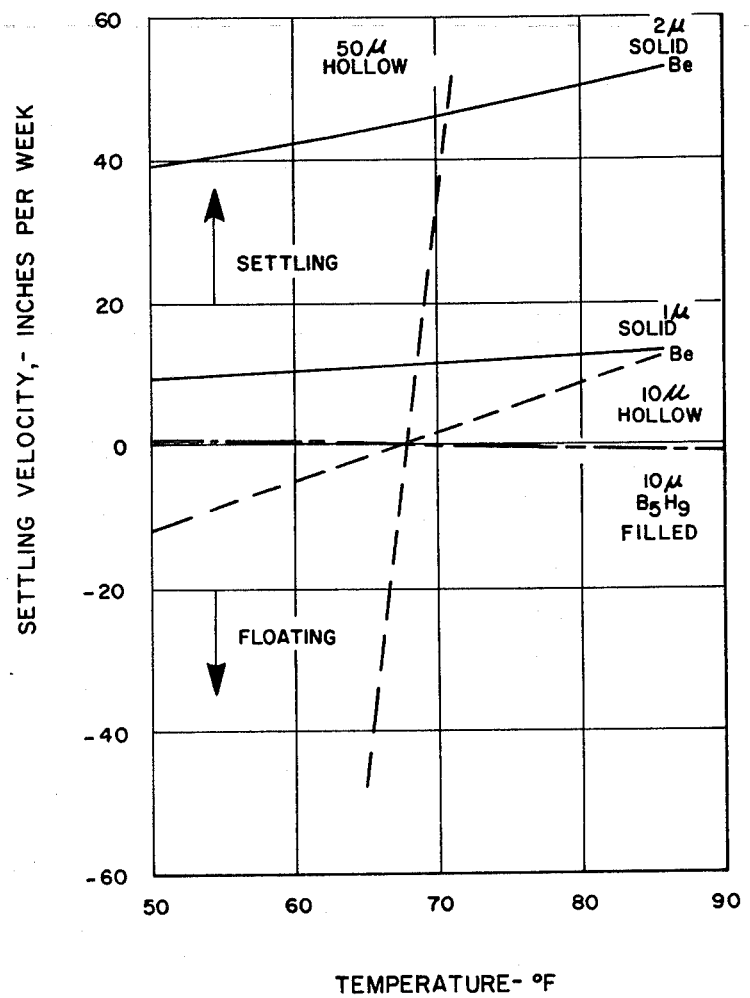

The settling rates of a variety of particles are shown in FIGS. 7 and 8. In FIG. 7, solid Be particles of 1 and 4 microns diameter are included, together with both hollow and filled particles assumed isopycnic with nitrogen tetroxide at 68° F. Note that 10 micron isopycnic particles show less settling than the 1 micron solid Be particle for only a narrow temperature range, even with partial temperature compensation, but are still better than the 4 micron solid particles. As shown in FIG. 8, in hydrazine, 1 and 2 micron solid beryllium particles are compared with 10 and 50 micron hollow particles and 10 micron filled (temperature compensated) particles. In this case the 10 micron hollow particles, isopycnic at 68° F., is superior to even the 1 micron particle for a temperature range of 30 degrees. The compensated particle, filled with pentaborane, shows (on this scale) almost no settling or floating over a wide temperature span. FIG. 5 shows, on a greatly expanded scale, the settling rates of compensated particles in this system showing over a 20 degree range calculated settling or floating rates of less than an inch per year. It is most probable that with density matching this close, the effects of Brownian motion in the carrier fluid could not be ignored, and settling might even be less than calculated.

The metal particles of the isopycnic slurries of this invention will generally have an average particle size of less than about 200 microns and preferably of a particle size of 1–20 mircons.

The isopycnic concept of this invention applied to liquid propellants results in stable storable propellants with high theoretical impulses, easily controlled thrust levels, automatically regulated O/F ratios, reduced requirements for gelling agents, safe inclusion of highly energetic materials, and relatively easy pumpability. Use of the ingredients in the proportions indicated produces significant performance gains over unmetallized propellant systems.

The use of the temperature compensated isopycnic slurry concept of this invention reduces the rate of settling or floating in an isopycnic slurry subject to temperature changes by as much as a factor of a hundred. In the case of an isopycnic slurry of a metal in an oxidizer as for example Al in $H_2O_2$, or Be in $H_2O_2$, the use of a high-energy, hydrogen containing liquid such as pentaborane as the filling liquid will increase performance and allow use of the slurry as a monopropellant.

The invention in its broader aspects is not limited to the specific steps, methods and compositions described but departures may be made therefrom within the scope of the accompanying claims without departing from the principles of the invention and without sacrificing its chief advantages.

What is claimed is:

1. As a new and useful component of a propellant or fuel for use in a combustion system of a motor or engine, a slurry of a finely-divided metal in the form of hollow metal particles and a liquid oxidizer carrier selected from the group consisting of hydrogen peroxide, liquid oxygen, chlorine trifluoride and nitrogen tetroxide, said slurry characterized by the fact that the density of the metal particles is substantially equal to the density of the liquid oxidizer carrier.

2. As a new and useful component of a liquid propellant or fuel for use in a combustion system of a motor or engine, a slurry of finely-divided metal particles and a combustible liquid carrier, said metal particles comprising hollow-metal particles filled with solid core material comprising a low density energetic material for enhancing specific impulse performance, said core material selected from the group consisting of lithium and low density metal hydrides, said slurry characterized by the fact that the density of the metal particles is substantially equal to the density of the liquid carrier.

3. As a new and useful component of a liquid propellant or fuel for use in a combustion system of a motor or engine, a slurry of finely-divided metal particles and a combustible liquid carrier, said metal particles comprising hollow-metal particles filled with liquid core material of a lower density and higher thermal expansion than the liquid carrier to provide a slurry capable of compensating for fluctuations in temperature, said liquid core material selected from the group consisting of pentaborane, hydrazine, ethyl alcohol, water, nitrogen tetroxide and hydrogen peroxide, said slurry characterized by the fact that the density of the metal particles is substantially equal to the density of the liquid carrier.

References Cited
UNITED STATES PATENTS

| | | | |
|---|---|---|---|
| 3,105,747 | 10/1963 | Calhoun et al. | 44—51 |
| 3,143,446 | 8/1964 | Berman | 149—36 X |
| 3,153,902 | 10/1964 | Morrell | 149—87 X |
| 3,153,903 | 10/1964 | Morrell | 149—87 X |
| 3,164,504 | 1/1965 | White et al. | 149—87 X |
| 3,203,773 | 8/1965 | Landesman | 44—51 |
| 3,204,560 | 9/1965 | Gustavson | 149—2 |
| 3,243,326 | 3/1966 | White et al. | 149—87 |
| 3,252,842 | 5/1966 | Williams | 149—87 |

LELAND A. SEBASTIAN, Primary Examiner

U.S. Cl. X.R.

44—51; 60—216; 149—2, 3, 5, 6, 21, 22, 36, 74, 87, 109, 114; 264—4